United States Patent [19]

Bjornholt

[11] Patent Number: 4,730,265

[45] Date of Patent: Mar. 8, 1988

[54] SPLIT-PHASE MATCHED FILTER USING SINGLE COMPARATOR

[75] Inventor: John E. Bjornholt, Mesa, Ariz.

[73] Assignee: Motorola, Inc., Schaumburg, Ill.

[21] Appl. No.: 892,963

[22] Filed: Aug. 4, 1986

[51] Int. Cl.⁴ ................................................ G06J 1/00
[52] U.S. Cl. ...................................... 364/602; 364/825
[58] Field of Search ............... 364/825, 829, 602, 807; 375/120

[56] References Cited

U.S. PATENT DOCUMENTS 4,326,169  9/1982  Fenderson ...................... 328/167 X
4,358,790  11/1982  Summers ............................ 358/147
4,419,760  12/1983  Bjornholt ............................ 375/120
4,644,523  2/1987  Horwitz ................................. 375/1

Primary Examiner—Jerry Smith
Assistant Examiner—Charles B. Meyer
Attorney, Agent, or Firm—Maurice J. Jones, Jr.; Eugene A. Parsons

[57] ABSTRACT

A split-phase integrate and dump matched filter utilizes both the positive and negative inputs of a single comparator and adds an exclusive-OR logic element after the matched filter to correct the data polarity since the negative-input path of the data output is inverted.

8 Claims, 3 Drawing Figures

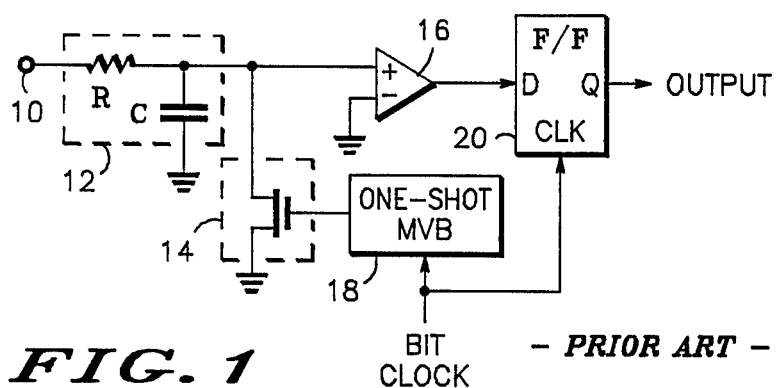
*FIG. 1*  — PRIOR ART —
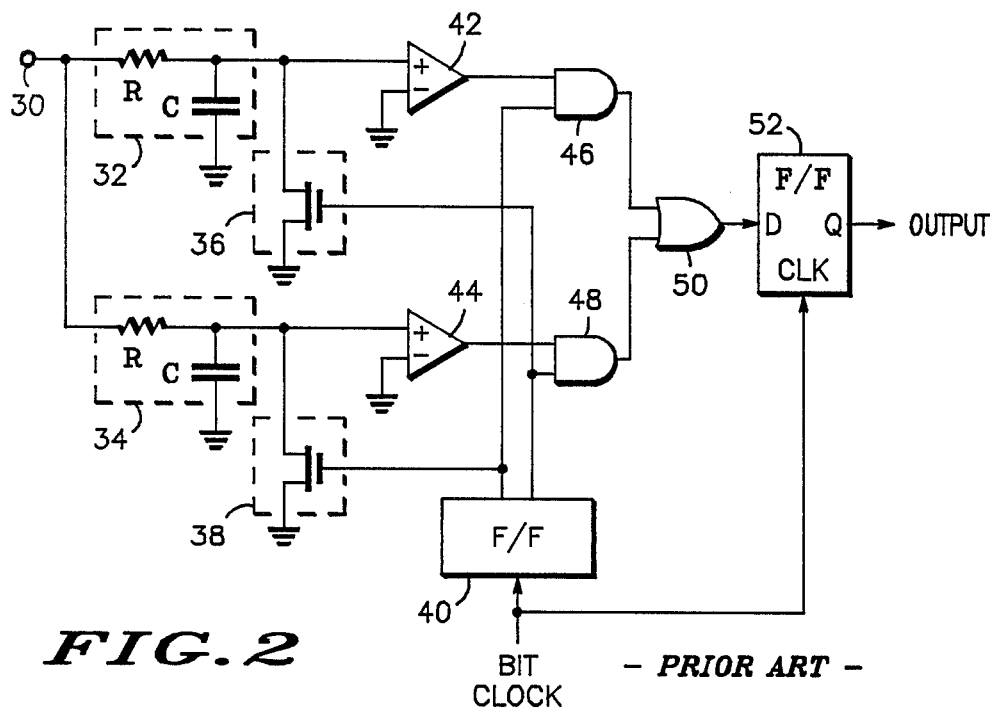
*FIG. 2*  — PRIOR ART —

SPLIT-PHASE MATCHED FILTER USING SINGLE COMPARATOR

BACKGROUND OF THE INVENTION

This invention pertains to the matched filtering of high speed digital data. Generally, noisy data, which is in analogue form, is required to be decoded into digital ones or zeros. The digital data matched filtering process is one of integrating an input signal over a known bit time and determining at the end of the integration whether the result is positive or negative. Theoretically, this provides optimal detection by maximizing the signal-to-noise ratio, since over the entire bit time, the effects of noise tend to cancel out. Integration is typically performed in analogue form by charging a capacitor, which must then be dumped prior to starting a new integration. In high speed data systems, this dumping process can take a significant time with respect to a bit time. The result is less integration time, and consequentially, sub-optimal detection. Split-phase matched filters allow one phase to be integrating while the alternate phase is dumping. This provides a full bit time to integrate the signal, while simultaneously providing a full bit time to dump the charge on the capacitor. The standard approach for this technique is to use two independent comparators, then logically selecting the active one.

The prior art split-phase matched filter mentioned above requires two independent comparators because only the positive input of each comparator is used. Because comparators are generally higher in power and more expensive than logic elements, the need for a new split-phase matched filter has arisen.

SUMMARY OF THE INVENTION

The present invention pertains to a split-phase matched filter which requires the use of only one comparator because unlike prior devices, it utilizes both the positive and negative inputs of the comparator. The addition of a simple exclusive-OR logic element after the matched filter is used to correct the data polarity since the negative-input half of the data output is inverted.

It is therefore an object of the present invention to provide a new and improved split-phase matched filter which is less complex and less expensive than prior art devices.

It is a further object of the present invention to provide a new and improved split-phase matched filter which requires less power.

These and other objects of this invention will become apparent to those skilled in the art upon consideration of the accompanying specification, claims, and drawings.

BRIEF DESCRIPTION OF THE DRAWINGS

Referring to the drawings:

FIG. 1 is a schematic illustration of a prior art integrate-and-dump matched filter;

FIG. 2 is a schematic illustration of a prior art split-phase integrate-and-dump matched filter.

DESCRIPTION OF THE PREFERRED EMBODIMENTS

Figure 3:
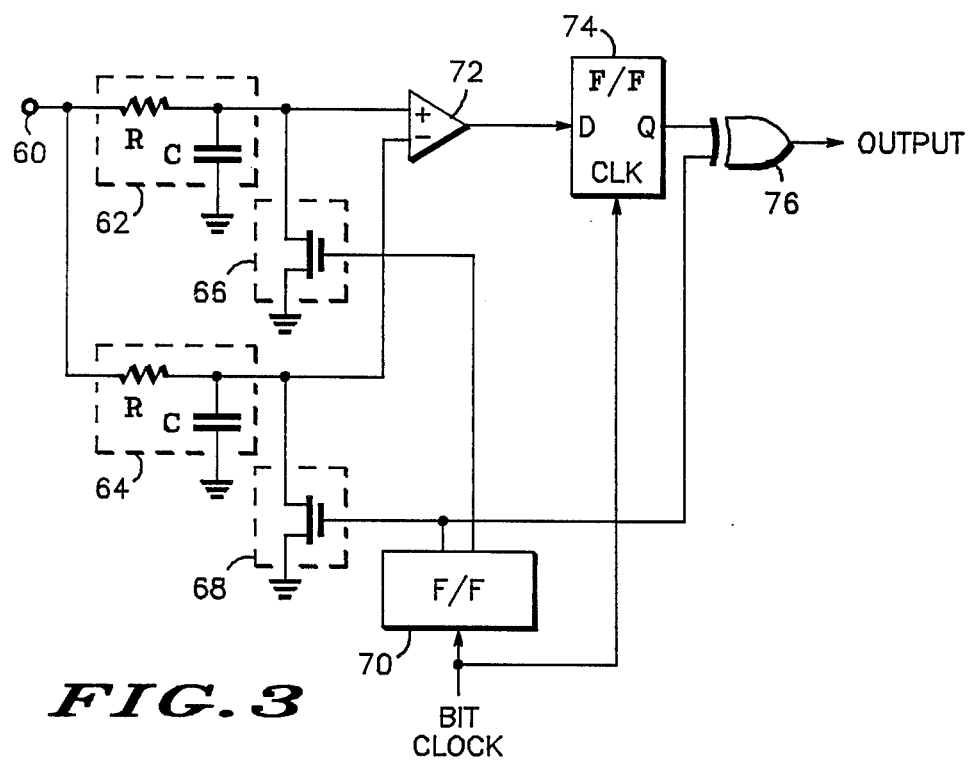
FIG. 3 is a schematic illustration of a split-phase integrate-and-dump matched filter embodying the present invention.

Referring specifically to FIG. 1 a prior art integrate and dump matched filter is shown. An input is applied to electrical line 10 which then passes into integrator 12. In FIG. 1, integrator 12 is illustrated as an R-C series connected to ground. It should be clear to those skilled in the art that the resistor and capacitor of integrator 12 can be adjusted depending on the required charge to be built up on the capacitor and the required time to place the charge on the capacitor. The capacitor operates as an integrator that integrates the input signal over a predetermined bit time. In order to begin a new integration, the charge on the capacitor must periodically be dumped. Switch 14 is used for this dumping function. Switch 14 operates as an open circuit except when a bit pulse is applied to it by pulsing device 18. When activated by the bit pulse, switch 14 is a short circuit and the charge stored on the capacitor of integrator 12 is dumped through switch 14. Unfortunately, the time required for integrator 12 to dump the charge in order to begin a new integration eliminates time which integrator 12 could be integrating. Therefore, signal detection is not optimal since the integration is not over the entire bit time but over the difference in time between the bit time and the time required for integrator 12 to dump its stored charge. Comparator 16 has its positive input connected so as to read the value of integrator 12. The negative input of comparator 16 is connected to ground. The output of comparator 16 forms the input of delay flip-flop 20 and the output of flip-flop 20 is digital ones or zeros based on the integration of the input to electrical line 10 over the sub-optimal timeframe.

Referring specifically to FIG. 2 a prior art split phase implementation of an integrate and dump matched filter is shown. An input is applied to electrical line 30, which then splits and connects to comparator 32 and comparator 34. Comparators 32 and 34 are parallel to one another. Switch 36 is activated when integrator 32 is being dumped and switch 38 is activated when integrator 34 is being dumped. Pulsing device 40 insures that only one of switches 36 and 38 are activated at one time and also constantly changes which one of switches 36 and 38 receives the required bit pulse to activate. Comparator 42 and comparator 44 both have their negative input connected to ground. The positive input of comparator 42 is connected to integrator 32 and the positive input of comparator 44 is connected to integrator 34. The inputs of logic AND gate 46 are the output of comparator 42 and the pulse supplied to switch 38 by pulsing means 40. The inputs of a logic AND gate 48 are the output of comparator 44 and the pulse supplied to switch 36 by pulsing means 40. The output of logic AND gate 46 and the output of logic AND gate 48 create the inputs of logical OR gate 50. Logic gates 46, 48, and 50 are utilized to determine which one of integrators 32 and 34 is in the active integrating function. The output of OR gate 50 is the input of delay flip-flop 52 and the output of delay flip-flop 52 is a digital one or zero based on the integration over a predetermined bit time of the input supplied to electrical line 30. It should be clear to those skilled in the art that the device of FIG. 2 eliminates the problem of dumping time since while one integrator is dumping, the other integrator is being integrated and measured. This provides for a full bit time to both integrate and dump the charge on the capacitor, thus resulting in optimal detection.

Referring specifically to FIG. 3 an embodiment of the present invention, a split-phase matched filter using a single comparator, is illustrated wherein an input is supplied to electrical line 60 which then splits into integrator 62 and integrator 64. Integrators 62 and 64 are parallel to one another. Switch 66 is activated when integrator 62 is being dumped and switch 68 is activated when integrator 64 is being dumped. Pulsing device 70 insures that only one of switch 66 and switch 68 is activated at one time and also constantly changes which one of switches 66 and 68 receives the required bit pulse to activate. It should be apparent to those skilled in the art that pulsing device 70 can be a toggle flip-flop and the like with its output pin (Q) supplying a pulse to switch 68 and its negated output pin ($\overline{Q}$) supplying a pulse to switch 66. It should also be apparent to those skilled in the art that switches 66 and 68 are usually FET switches and the like. The positive input of comparator 72 is connected to integrator 62 and the negative input of comparator 72 is connected to integrator 64. The output of comparator 72 forms the input of flip-flop 74. FIG. 3 shows flip-flop 74 as a delay flip-flop but it should be clear that the use of other types of flip-flops is possible. Furthermore, the timing of flip-flop 74 relative to the timing of pulsing device 70 should be apparent to those skilled in the art as should the values of the resistors and capacitors used in integrators 62 and 64. The output of flip-flop 74 forms an input to exclusive-OR gate 76 while the other input of exclusive-OR gate 76 is the same as the signal applied to switch 68 by pulsing device 70. The output of exclusive-OR gate 76 is a digital one or zero based on the integration over a predetermined bit time of the input signal supplied to electrical line 60. Exclusive-OR gate 76 is used to correct the data polarity of the matched filter since the negative-input half of the data output is inverted.

By utilizing the negative input of the sole comparator and adding an exclusive-OR logical element after the matching filter, this invention permits the matched filtering of high speed digital data using a single comparator, while maintaining the advantages of a split phase integrate-and-dump filter. While I have shown and described a specific embodiment of this invention, further modifications and improvements will occur to those skilled in the art. I desire it to be understood, therefore, that this invention is not limited to the particular form shown and I intend to cover all modifications which do not depart the spirit and scope of this invention.

What is claimed is:

1. A split-phase matched filter comprising a pair of parallel connected integrate-and-dump circuits having outputs connected to inputs of a single comparator and said integrate-and-dump circuits further connected to alternately integrate and alternately dump.

2. The split-phase matched filter as recited in claim 1 and futher comprising:
   a flip-flop which has an input supplied by an output of said comparator; and
   an exclusive—OR logic gate having inputs consisting of an output of said flip-flop and an alternating signal supplied by a signaling means.

3. A split-phase matched filter comprising:
   first and second integrators;
   an input line common to said first and second integrators;
   a first dumping means connected parrallel to said first integrator capable of discharging said first integrator when activated;
   a second dumping means connected parallel to said second integrator capable of discharging said second integrator when activated;
   a comparator possessing a positive input and a negative input wherein said positive input is connected to said first integrator and said first dumping means and said negative input is connected to said second integrator and said second dumping means;
   a flip-flop which has an input supplied by the output of said comparator and an output;
   signaling means capable of supplying a first activating signal to said first dumping means and a second activating signal to said second dumping means whereby said first signal and said second signal are always opposite pulsing logic levels which alternately allow one, and then the other, of said first dumping means and said second dumping means to be activated at one time;
   an exclusive-OR logic gate having inputs consisting of the output of said delay flip-flop and said second signal supplied by said signaling means.

4. A split-phase matched filter as recited in claim 3 wherein said first and second integrators are R-C integrators.

5. A split-phase matched filter as recited in claim 4 wherein said first dumping means is a FET switch and said second dumping means is a FET switch.

6. A split-phase matched filter as recited in claim 5 wherein said signaling means is a toggle flip-flop with its output pin (Q) supplying said second signal and its negated output pin ($\overline{Q}$) supplying said first signal.

7. A split-phase matched filter as recited in claim 6 wherein said flip-flop is a delay flip-flop.

8. A method of split-phase matched filtering comprising the steps of integrating and dumping an input signal a first time, dumping and integrating said input signal a second time simultaneously to said integrating and dumping step, generating a first intermediate signal out of said integrating and dumping step, generating a second intermediate signal out of said dumping and integrating step, supplying said first intermediate signal to a positive input of a comparator, supplying said second intermediate signal to a negative input of said comparator, attaching activating means capable of supplying a first pulsing signal to control said integrating and dumping step and a second pulsing signal to control said dumping and integrating step wherein said first and second pulsing signals alternately allow only one of said integrating and dumping step and said dumping and integrating step to be integrating at one time, connecting an output of said comparator to a flip-flop, and sending both an output of said flip-flop and said second pulsing signal to the inputs of an exclusive-OR logic gate.

* * * * *